(12) United States Patent
Adams

(10) Patent No.: US 11,777,964 B2
(45) Date of Patent: Oct. 3, 2023

(54) CLIPBOARD LISTENER DETECTOR

(71) Applicant: MALIKIE INNOVATIONS LIMITED, Dublin (IE)

(72) Inventor: Neil Patrick Adams, Waterloo (CA)

(73) Assignee: Malikie Innovations Limited, Dublin (IE)

( * ) Notice: Subject to any disclaimer, the term of this patent is extended or adjusted under 35 U.S.C. 154(b) by 944 days.

(21) Appl. No.: 16/289,718

(22) Filed: Mar. 1, 2019

(65) Prior Publication Data
US 2020/0280574 A1    Sep. 3, 2020

(51) Int. Cl.
| | | |
|---|---|---|
| H04L 9/40 | (2022.01) | |
| G06F 16/955 | (2019.01) | |
| G06F 9/54 | (2006.01) | |
| G06F 17/18 | (2006.01) | |

(52) U.S. Cl.
CPC .......... *H04L 63/1425* (2013.01); *G06F 9/543* (2013.01); *G06F 16/955* (2019.01); *G06F 17/18* (2013.01)

(58) Field of Classification Search
None
See application file for complete search history.

(56) References Cited

U.S. PATENT DOCUMENTS

| | | | | |
|---|---|---|---|---|
| 8,856,869 | B1* | 10/2014 | Brinskelle | H04L 63/0823 726/2 |
| 9,098,698 | B2* | 8/2015 | Ghosh | G06F 9/45545 |
| 11,113,126 | B2* | 9/2021 | Gallagher | G06F 40/14 |
| 11,379,573 | B2* | 7/2022 | Li | G06F 21/44 |
| 2008/0082932 | A1* | 4/2008 | Beumer | G06F 9/543 715/764 |
| 2012/0066691 | A1* | 3/2012 | Branton | G06F 9/543 719/312 |
| 2016/0306964 | A1* | 10/2016 | Austin | G06F 21/556 |
| 2017/0180427 | A1* | 6/2017 | Kashyap | G06F 21/6209 |
| 2017/0242983 | A1* | 8/2017 | Adams | G06F 21/6209 |
| 2018/0152471 | A1* | 5/2018 | Jakobsson | H04L 63/1425 |

(Continued)

FOREIGN PATENT DOCUMENTS

| | | |
|---|---|---|
| EP | 2428894 A1 | 3/2012 |
| EP | 3196798 A1 | 7/2017 |
| EP | 3208713 A1 | 8/2017 |

OTHER PUBLICATIONS

EPO: Extended European Search Report relating to EP application No. 20154418.6, dated Jul. 2, 2020.

(Continued)

*Primary Examiner* — Haimei Jiang
(74) *Attorney, Agent, or Firm* — Botus Churchill IP Law LLP

(57) ABSTRACT

A computer-implemented method of detecting clipboard listener applications that includes placing, by a clipboard listener-detector application, a content reference, such as a Uniform Resource Identifier (URI), on a device clipboard; receiving, by the clipboard listener-detector application, at least one request from one or more clipboard listener applications for data based on the content URI; identifying the one or more clipboard listener applications from which said at least one request was received; and outputting an identity of each of the one or more identified clipboard listener applications.

21 Claims, 3 Drawing Sheets

(56) References Cited

U.S. PATENT DOCUMENTS

2018/0375877 A1* 12/2018 Jakobsson ............. G06F 16/955
2019/0207955 A1*  7/2019 El-Moussa .......... H04L 63/1408
2019/0303596 A1* 10/2019 Du ........................ G06F 21/629
2019/0318087 A1* 10/2019 Chen ....................... G06F 21/53
2020/0382623 A1* 12/2020 Swedlund ................. H04L 5/14

OTHER PUBLICATIONS

"Hey, You, Get Off of My Clipboard", Sascha Fahl, et al., Apr. 2013, fc13.ifca.ai/proc/42.pdf.
EPO: Office Action relating to EP application No. 20154418.6, dated Feb. 21, 2022.

* cited by examiner

CLIPBOARD LISTENER DETECTOR

FIELD

The present application generally relates to information security, and more particularly, to security of clipboard applications on computing devices.

BACKGROUND

Computing devices typically provide a clipboard-based framework for copying and pasting data within an application or between applications. The clipboard usually supports both simple and complex data types, including text strings, complex data structures, text and binary stream data, and even application assets. Simple text data is stored directly in the clipboard, while complex data is stored as a reference that the pasting application resolves with a content provider.

In use, the clipboard framework allows for data to be put into a clip object, and then the clip object is put on the system-wide clipboard. The clip object can take one of three forms: a simple text string; an intent which supports copying application shortcuts; or a URI (Uniform Resource Identifier) for copying complex data from a content provider by resolving the URI object to a data source.

On some computing devices no special permissions are needed by applications for listening in on the clipboard nor for retrieving content from the clipboard when notified of new content. Furthermore, on some computing devices there is no API (Application Programming Interface) to determine which application(s) is/are listening in on the clipboard or copying from the clipboard. Thus, such computing devices are vulnerable to attack by malicious applications which may surreptitiously monitor the clipboard and copy potentially sensitive data.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
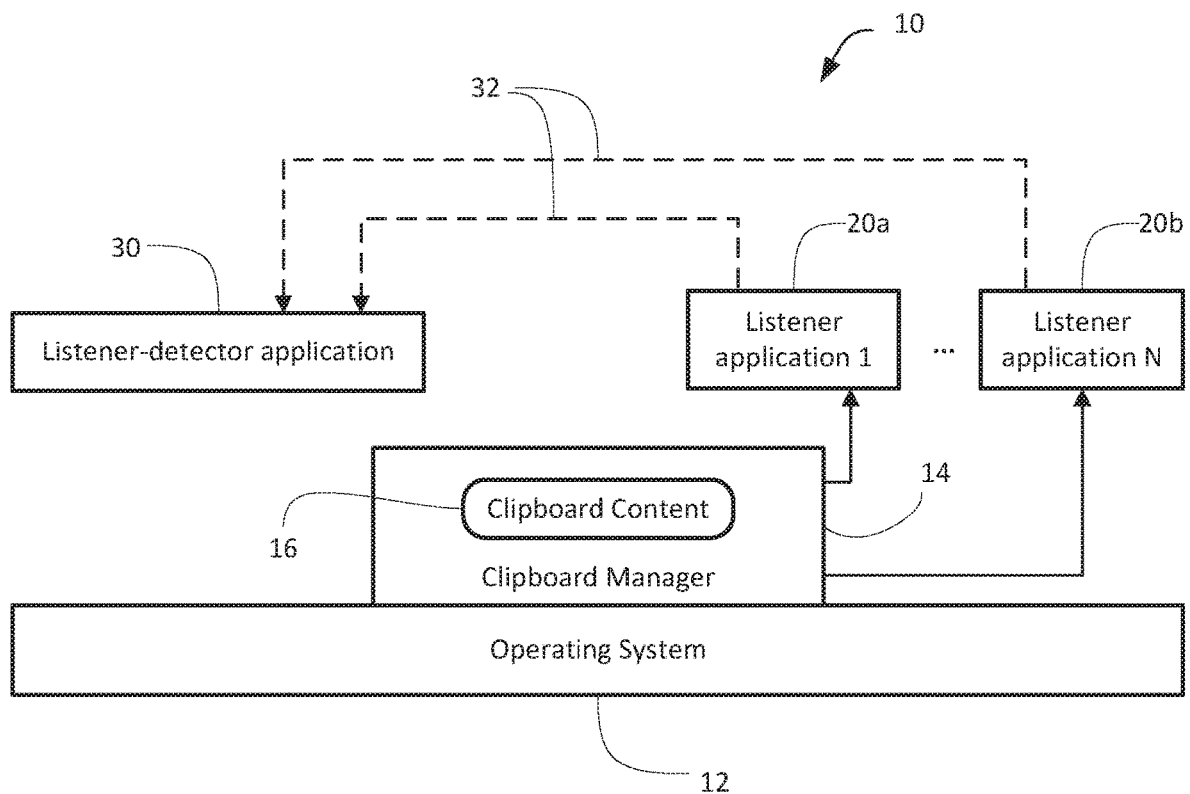
FIG. 1 illustrates, in block diagram form, an example system including a clipboard and clipboard listener applications.

In a first aspect, the present application describes a computer-implemented method of detecting clipboard listener applications comprising: placing, by a clipboard listener-detector application, a content reference on a device clipboard; receiving, by the clipboard listener-detector application, at least one request from one or more clipboard listener applications for data based on the content reference; identifying the one or more clipboard listener applications from which said at least one request was received; and outputting an identity of each of the one or more identified clipboard listener application.

In some implementations, the content reference includes a content Uniform Resource Identifier (URI).

In some implementations, the identity of said one or more identified clipboard listener applications is stored by the device for further processing, and the further processing consists of compiling statistics regarding how often one or more clipboard listener applications are identified.

In another aspect, outputting an identity of each of the one or more identified clipboard listener applications comprises either displaying the identity on the device display or transmitting the one or more identities to another device.

In a further aspect, the at least one request for data based on the content URI comprises either a request for content pointed at by the URI or a request for a text representation of the content URI or content pointed at by the URI. The request for a text representation of the content pointed at by the URI may be a coerce-to-text request.

In yet a further aspect, the present application describes a non-transitory computer-readable storage medium storing processor-readable instructions that, when executed, configure a processor to perform any of the methods described herein. Also described in the present application is a computing device comprising: a processor, memory, and a clipboard listener-detector application containing processor-executable instructions that, when executed, cause the processor to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

As noted above, many operating systems provide a clipboard to facilitate cutting-and-pasting of data within and between applications. Moreover, may operating systems permit applications to "listen" to the clipboard, which may include registering with a clipboard manager for notification of any changes or updates to the clipboard content.

This has produced a particular security concern for some operating systems. A particular vulnerability arises when password managers use the clipboard for passing sensitive data, including login credentials, to an application like a web-browser or any other application into which a user is prompted to input credentials. Other vulnerabilities may arise in the case of passing other sensitive data to applications via the clipboard, including, for example, personal information, credit card details or other banking information, or cryptographic key information. Unfortunately, some operating systems permit any application to listen to the clipboard and to copy its contents. Some of those same operating systems do not provide a mechanism, such as an API, to discover what applications are listening to, or copying from, the clipboard.

Accordingly, in accordance with one aspect of the present application, a clipboard listener detector is described. The clipboard listener detector is a software-implemented application that prompts the clipboard listeners to reveal their identities. It does so, in one example implementation, through placing data on the clipboard that will cause the clipboard listeners to each send a request or other messaging to the clipboard listener detector, thereby revealing their identities. The clipboard listener detector may then output the identities of the clipboard listeners. The output may be through displaying the identities on a display, transmitting them to another application or to another device, or otherwise revealing the identities of the clipboard listeners to enable administrative software or users to assess whether any unknown, unexpected, or likely malicious applications are listening to and copying data from the clipboard.

Reference is first made to FIG. 1, which shows, in block diagram form, an example system 10 that includes an operating system 12, which provide clipboard functionality through a clipboard manager 14. The operating system 12 may be any suitable operating system, such as the Android™ operating system, for example. Some of the example embodiments described herein may be based on the Android™ operating system, but the present application is not limited to any particular operating system provided that the operating system provides a clipboard function and that other applications are able to listen to the clipboard.

The clipboard manager 14 may manage clipboard content 16. The clipboard content 16 placed on the clipboard may include simple text or more complex data. In some implementations, the clipboard content 16 may be a clipboard object that include some metadata regarding the content and clipboard data. The clipboard data may be simple text or may be a content reference to more complex data. The content reference pointing to more complex data may include a content URI pointing to a content provider that stores the complex data. In another example, the clipboard data may include an "intent", such as a shortcut. It will be appreciated that a URI is an example of a content reference.

In some examples, the clipboard may only contain one object at a time. Any new object copied to the clipboard causes removal of a previous object. In some other examples, the clipboard may store more than one object at a time.

The clipboard manager 14 may be an application, a class, a service, or other software construct depending on the nature of the operating system 12 and the programming language used. The range of possibilities will be appreciated by those ordinarily skilled in the art. Using software instructions suitable to the programming environment, an application or other software object may place data on the clipboard by creating a new clipboard object containing the clipboard data and calling a function to add the new clipboard object to the clipboard.

Various applications, such as listener applications 20a, 20b (referred to collectively by reference numeral 20), may have registered with the operating system 12 or the clipboard manager 14 to receive notifications when the content on the clipboard is changed. Accordingly, when an object is added to the clipboard a message may be sent to the listener applications 20 to alert them to the change in the clipboard content 16. The listener applications 20 may be configured to copy newly-added content from the clipboard. In the case of a malicious application, like one attempting to obtain password information or other sensitive data, the application is likely to copy the contents of the clipboard. Unless the operating system 12 provides an API to discover what applications have accessed and copied clipboard content 16, malicious applications may be able to operate without detection.

Accordingly, in this example, the system 10 includes a listener-detector application 30. The listener-detector application 30 prompts the listener applications 20 to reveal their identities. It does so by placing data on the clipboard that will cause the listener applications 20 to contact the listener-detector application 30. If the clipboard contents 16 is plaintext, then the listener applications 20 may simply obtain the plaintext data. However, if the listener-detector application 30 places a content URI on the clipboard, with the listener-detector application 30 as the content provider, then the listener applications 20 may contact the listener-detector application 30 to obtain the content or a representation of the content.

A listener application 20 may request the data pointed at by the content URI by calling the content provider method. This is effectively a request 32 to the content provider from the listener application. However, in some implementations, the listener application 20 may only want to handle text-based data. In this case, it may employ a "coerce-to-text" operation. The coerce-to-text operation is a request to the content provide to provide (a) the content data in text form, if available, or (b) a text representation of the content URI. In either case, the request 32 is directed to the content provider, which in this example is the listener-detector application 30. Accordingly, the listener-detector application 30 receives the request 32 and may identify the listener application 20 that generated the request 32. On this basis, it may identify each of the listener applications 20. The "identity" of the listener application 20 may include the name of the application, a process identifier, or any other such data identifying the listener application 20.

The listener-detector application 30 may then output the identities of the listener applications 20 to reveal which applications are attempting to copy data from the clipboard.

Figure 2:
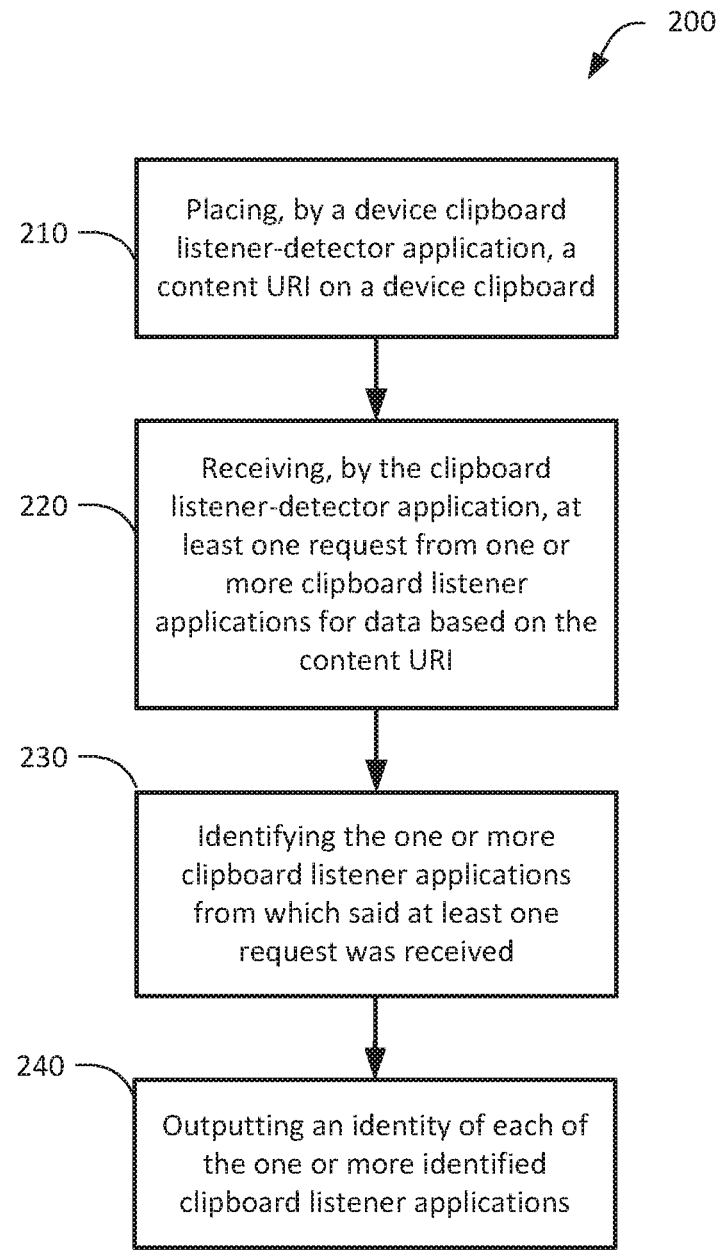
FIG. 2 shows, in flowchart form, an example method of detecting clipboard listener applications.

Reference is now made to FIG. 2, which shows, in flowchart form, an example method 200 of identifying applications listening to a clipboard in a computing device. The method 200 may be carried out by a listener-detector application, for example. At operation 210 of the computer-implemented method of FIG. 2, a clipboard listener-detector application places a content URI on a device clipboard. As previously discussed, a content URI may be used for copying complex data from a content provider by resolving the content URI to a data source. The clipboard listener-detector application has a content provider which is the data source for the content URI.

Upon placing of the content URI on the clipboard, the device operating system may, such as through the clipboard manager, automatically notify any clipboard listener applications. There may be multiple clipboard listener applications, i.e. more than one application registered with the computing device operating system to be notified when the system clipboard object changes. Registering as a listener in such a manner may require no special permissions. As noted previously, some computing environments place no restrictions on applications listening to and copying from the clipboard.

At operation 220 the clipboard listener-detector application receives at least one request from one or more clipboard listener applications for data based on the content URI.

It may be that the request is a request for content pointed at by the content URI. In one example implementation within the Android™ operating system, the request is generated by the clipboard listener application by first retrieving the clipboard object from the clipboard and getting a content resolver instance in order to access the content provider. The clipboard listener application then retrieves the primary clip from the clipboard and obtains its content as a URI. The clipboard listener application may then test to see if the URI is a content URI pointing to a valid content provider. It may also check that the content provider is able to provide a data type that the application can use. The clipboard listener application then calls the content resolver to get the data.

In another example, the clipboard listener application may only handle text, in which case the request may be a request for a text representation of the content pointed at by the content URI. As noted above, this request is a request to the content provider to provide the content in text form. In one example, this request may be implemented using a system coerce-to-text function. The function returns a text stream if the provider can return a text stream, or alternatively returns a text representation of the content URI if the provider does not offer a text stream.

At operation 230 the clipboard listener-detector identifies the one or more clipboard listener applications from which the at least one request was received. In one example, the clipboard listener-detector application content provider receives a call to retrieve the text via the aforementioned coerce-to-text function and can thus detect which applications are making the request (e.g. UID, package name).

In some embodiments, the identity of the one or more identified clipboard listener applications is stored by the computing device for further processing by the clipboard listener-detector application. Further processing may also consist of compiling statistics regarding how often one or more clipboard listener applications are identified. These statistics may be useful in the determination of (potentially) malicious applications. For example, an application that is identified to be excessively or indiscriminately pasting from the clipboard may be flagged as malicious and additional security measures may be introduced against it.

At operation 240, the clipboard listener-detector application outputs an identity of each of the one or more identified clipboard listener applications. It may be that the outputting comprises broadcasting to an activity by the clipboard listener-detector application content provider which then renders the identity on the device display, as in, for example, part of the clipboard listener-detector application user interface. It may also be that outputting comprises transmitting the identity to another device, such as, for example, another application, computing device or server.

Figure 3:
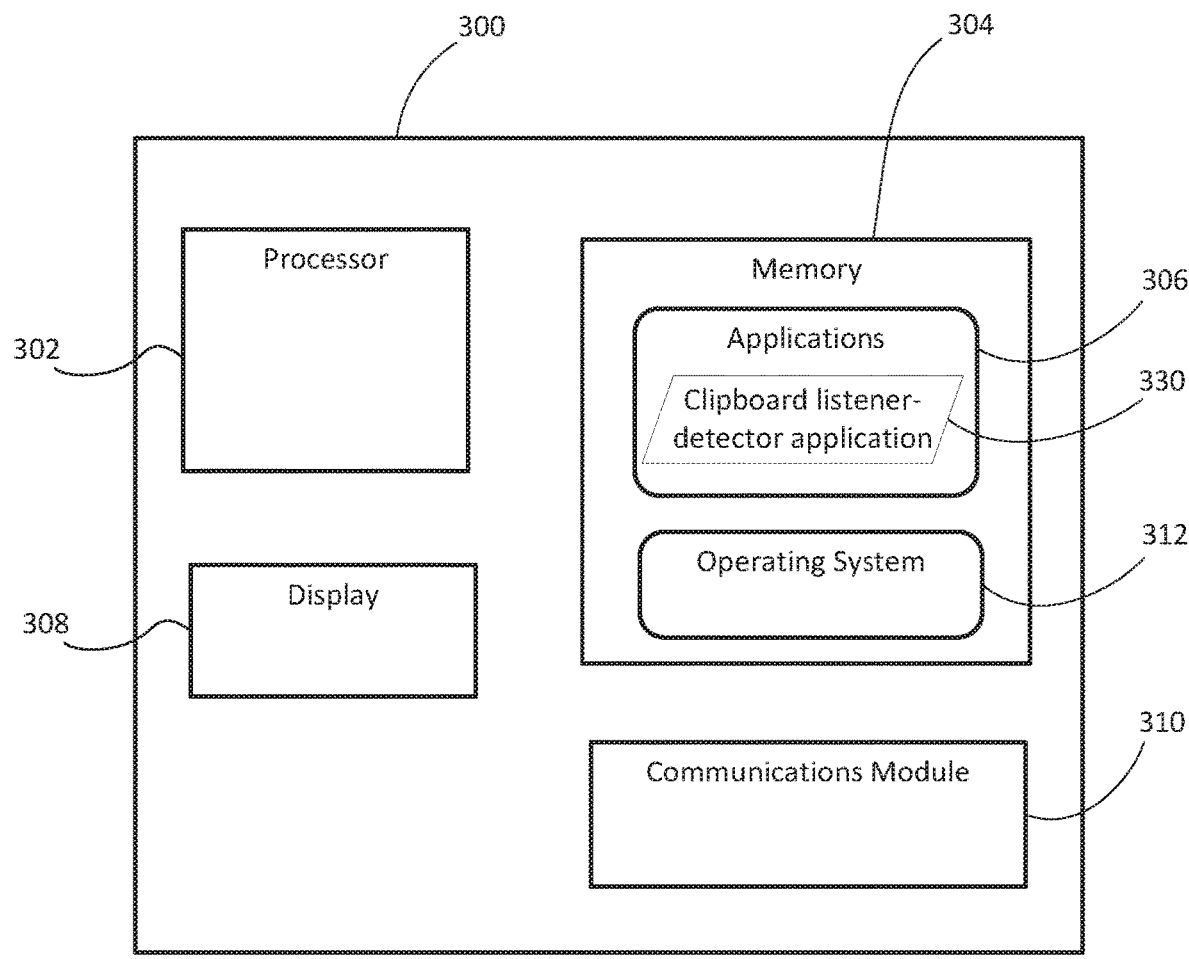
FIG. 3 depicts, in block diagram form, an example computing device configured for detecting clipboard listener applications.

Reference is now made to FIG. 3, which depicts a block diagram of an example computing device 300 implementing a clipboard listener-detector application 330. The computing device 300 includes a processor 302, which may include one or more processing units, and a memory 304. The memory 304 stores an operating system 312 and applications 306. The operating system 312 and applications 306 contain processor-executable instructions that, when executed by the processor 302, configure the processor 302 to carry out the operations described. The applications 306 may include clipboard listener applications and the clipboard listener-detector application 330. The memory 304 may further store data placed on a clipboard via a clipboard manager implemented by the operating system 312. The clipboard listener applications may receive notification of changes in the data stored in memory 304 on the clipboard and may attempt to obtain a copy of that data. The clipboard listener-detector application 330 may be configured to cause a content URI to be placed on the clipboard, thereby prompting the clipboard listener applications to transmit a request to the clipboard listener-detector 330 application that reveals their identities, for example using one of the embodiments described above. The clipboard listener-detector application 330 may store the identities in the memory 304.

The computing device 300 may further include a display 308 and a communications module 310. In some implementations, the clipboard listener-detector application 330 generates a user interface that is output on the display 308. The user interface displayed may include display of the identities of the clipboard listener applications. The clipboard listener-detector application 330 may also or alternatively transmit the identity of the one or more identified clipboard listener applications to a remote device or administrator via the communications module 310, for example.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computer-implemented method of detecting clipboard listener applications comprising:
    placing, by a clipboard listener-detector application, a content reference on a device clipboard, wherein the placing is not performed in response to user input;
    receiving, by the clipboard listener-detector application, at least one request from one or more clipboard listener applications for data based on the content reference, the at least one request for data received based on the one or more clipboard listener applications being notified of the content reference being placed on the device clipboard and not based on user input;
    identifying the one or more clipboard listener applications from which said at least one request was received; and
    outputting an identity of each of the one or more identified clipboard listener applications,
        wherein outputting an identity of each of the one or more identified clipboard listener applications includes displaying the identity on the device display.

2. The computer-implemented method of claim 1, wherein the identity of the one or more identified clipboard listener applications is stored by the device for further processing.

3. The computer-implemented method of claim 2, wherein the further processing includes compiling statistics regarding how often one or more clipboard listener applications are identified.

4. The computer-implemented method of claim 1, wherein outputting an identity of each of the one or more identified clipboard listener applications includes transmitting the identity to another device.

5. The computer-implemented method of claim 1, wherein the content reference includes a content Uniform Resource Identifier (URI) and wherein the at least one request for data based on the content URI includes a request for content pointed at by the URI.

6. The computer-implemented method of claim 1, wherein the content reference includes a content Uniform Resource Identifier (URI) and wherein the at least one request for data based on the content URI includes a request for a text representation of the content URI or content pointed at by the URI.

7. The computer-implemented method of claim 6, wherein the content reference includes a content Uniform Resource Identifier (URI) and wherein the request for a text representation of the content URI or content pointed at by the URI includes a coerce-to-text request.

8. A computing device configured to detect clipboard listener applications, the computing device comprising:
a processor,
a memory,
a clipboard listener-detector application stored in the memory and containing processor executable instructions that, when executed by the processor cause the processor to:
place a content reference on a device clipboard, wherein the content reference is not placed on the device clipboard in response to user input;
receive at least one request from one or more clipboard listener applications for data based on the content reference, the at least one request for data received based on the one or more clipboard listener applications being notified of the content reference being placed on the device clipboard and not based on user input of;
identify the one or more clipboard listener applications from which said at least one request was received; and
output an identity of each of the one or more identified clipboard listener applications,
wherein outputting an identity of each of the one or more identified clipboard listener applications includes displaying the identity on the device display.

9. The computing device of claim 8, wherein the identity of the one or more identified clipboard listener applications is stored in memory for further processing.

10. The computing device of claim 9, wherein the further processing includes compiling statistics regarding how often one or more clipboard listener applications are identified.

11. The computing device of claim 8, wherein outputting an identity of each of the one or more identified clipboard listener applications includes transmitting the identity to another device.

12. The computing device of claim 8, wherein the content reference includes a content Uniform Resource Identifier (URI) and wherein the at least one request for data based on the content URI includes a request for content pointed at by the URI.

13. The computing device of claim 8, wherein the content reference includes a content Uniform Resource Identifier (URI) and wherein the at least one request for data based on the content URI includes a request for a text representation of the content URI or content pointed at by the URI.

14. The computing device of claim 13, wherein the content reference includes a content Uniform Resource Identifier (URI) and wherein the request for a text representation of the content URI or content pointed at by the URI includes a coerce-to-text request.

15. A non-transitory computer-readable storage medium storing processor-readable instructions to detect clipboard listener applications in a computing device, wherein the processor-readable instructions, when executed, configure a processor to:
place a content reference on a device clipboard, wherein the content reference is not placed on the device clipboard in response to user input;
receive at least one request from one or more clipboard listener applications for data based on the content reference, the at least one request for data received based on the one or more clipboard listener applications being notified of the content reference being placed on the device clipboard and not based on user input;
identify the one or more clipboard listener applications from which said at least one request was received; and
output an identity of each of the one or more identified clipboard listener applications,
wherein outputting an identity of each of the one or more identified clipboard listener applications includes displaying the identity on the device display.

16. The non-transitory computer-readable storage medium of claim 15, wherein the identity of the one or more identified clipboard listener applications is stored by the device for further processing.

17. The non-transitory computer-readable storage medium of claim 16, wherein the further processing includes compiling statistics regarding how often one or more clipboard listener applications are identified.

18. The non-transitory computer-readable storage medium of claim 15, wherein outputting an identity of each of the one or more identified clipboard listener applications includes transmitting the identity to another device.

19. The non-transitory computer-readable storage medium of claim 15, wherein the content reference includes a content Uniform Resource Identifier (URI) and wherein the at least one request for data based on the content URI includes a request for content pointed at by the URI.

20. The non-transitory computer-readable storage medium of claim 15, wherein the content reference includes a content Uniform Resource Identifier (URI) and wherein the at least one request for data based on the content URI includes a request for a text representation of the content URI or content pointed at by the URI.

21. The non-transitory computer-readable storage medium of claim 20, wherein the content reference includes a content Uniform Resource Identifier (URI) and wherein the request for a text representation of the content URI or content pointed at by the URI includes a coerce-to-text request.

* * * * *